United States Patent [19]

Warren

[11] 4,015,704
[45] Apr. 5, 1977

[54] EGG CARRIER

[76] Inventor: William H. Warren, 729 S. Main St., Centerville, Mass. 02632

[22] Filed: Aug. 7, 1975

[21] Appl. No.: 602,549

[52] U.S. Cl. .............................. 198/652; 198/653; 198/655
[51] Int. Cl.² .......................................... B65G 17/46
[58] Field of Search .......... 198/131, 145, 146, 147, 198/148, 155, 158, 652, 653, 654, 655; 99/404, 405, 407, 440, 443 C; 211/14, 15; 312/129–131; 15/3.13, 3.16

[56] References Cited

UNITED STATES PATENTS

| | | | |
|---|---|---|---|
| 1,583,052 | 5/1926 | Kirchhoff | 198/145 |
| 1,876,072 | 9/1932 | Noonan | 99/440 |
| 2,189,243 | 2/1940 | Evans | 198/145 |
| 2,412,565 | 12/1946 | Davis | 211/14 X |
| 2,648,478 | 8/1953 | Carruthers | 99/443 C |
| 2,989,168 | 6/1961 | Mumma | 198/131 |
| 3,082,804 | 3/1963 | Shelton | 198/131 X |
| 3,143,120 | 8/1964 | Unthank | 198/145 X |
| 3,587,819 | 6/1971 | Deakan et al. | 198/131 X |
| 3,603,243 | 9/1971 | Foster | 99/407 X |
| 3,630,339 | 12/1971 | Van der Winden | 198/145 |

FOREIGN PATENTS OR APPLICATIONS

| | | | |
|---|---|---|---|
| 89,112 | 9/1958 | Netherlands | 198/131 |
| 1,150,977 | 5/1969 | United Kingdom | 15/3.13 |

*Primary Examiner*—Evon C. Blunk
*Assistant Examiner*—Richard K. Thomson
*Attorney, Agent, or Firm*—Holland, Armstrong, Wilkie & Previto

[57] ABSTRACT

An improved carrier system is described for rows of eggs. The system includes elongated open carriers with covers of movable rods permitting the covers to be automatically opened and closed. The carriers are mounted on spaced chains for movement through egg processing stations as, for example, hot water cooking chambers. Means are provided along the chain paths for opening and closing the carrier covers at appropriate positions in the process. The covers are closed when carriers move into the heated cooking water and are opened as the carriers emerge from the water toward an egg discharge station. Pivotal mountings of the carriers on the chains permit them to be dumped by dumping members provided along the chain paths at the egg discharge station.

9 Claims, 15 Drawing Figures

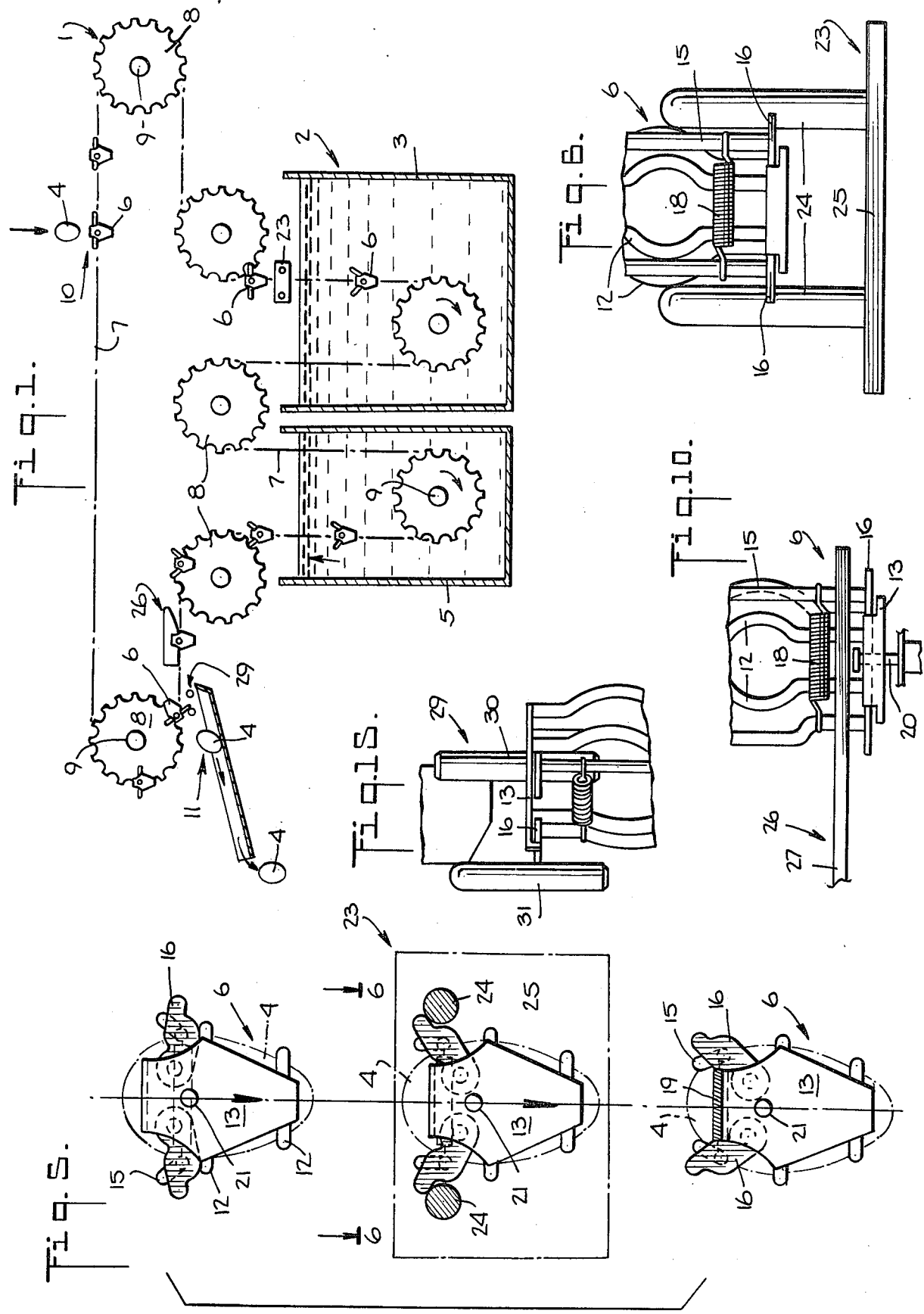

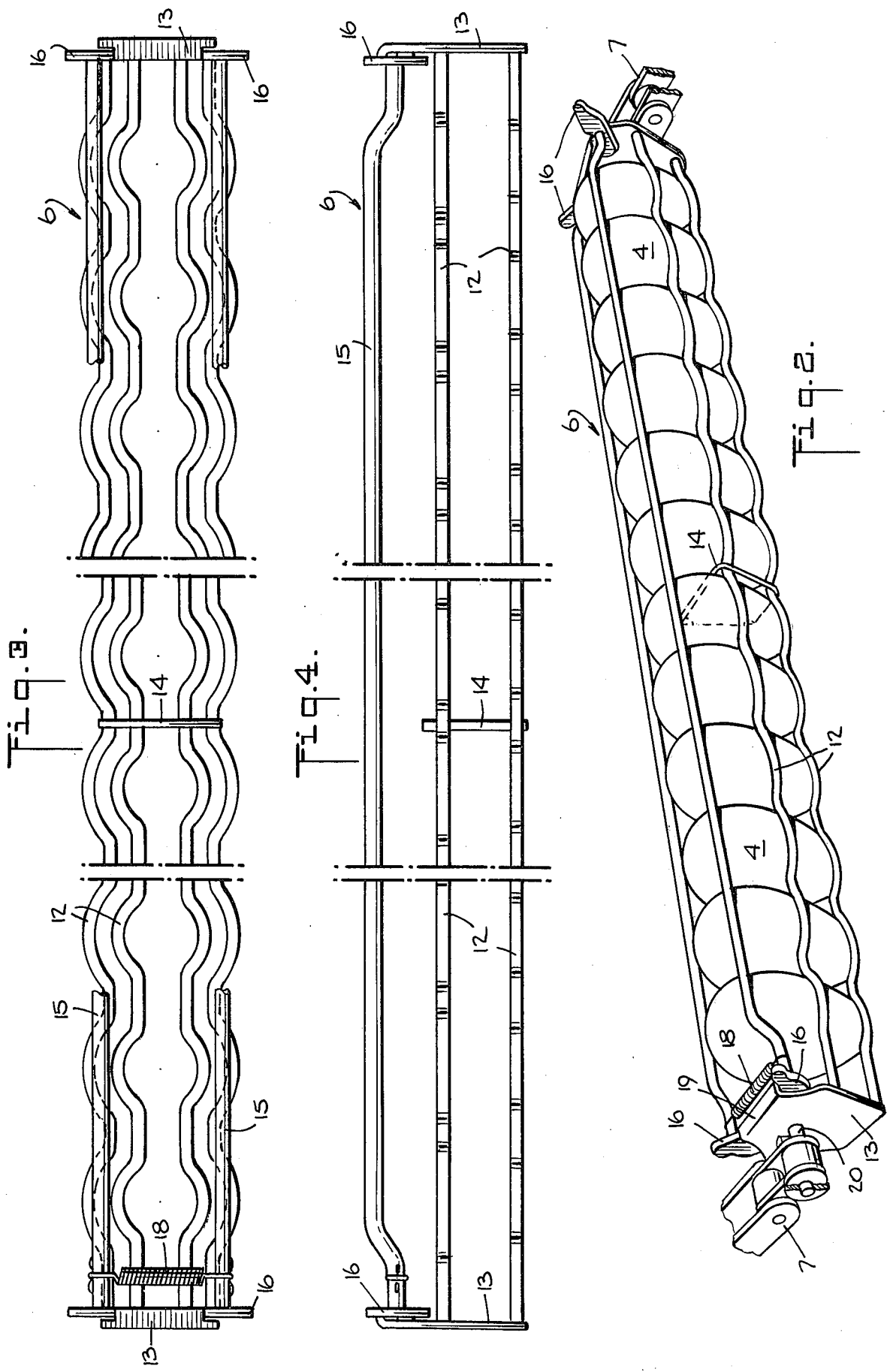

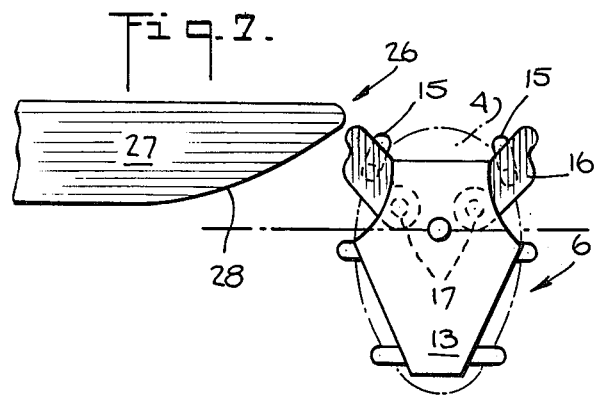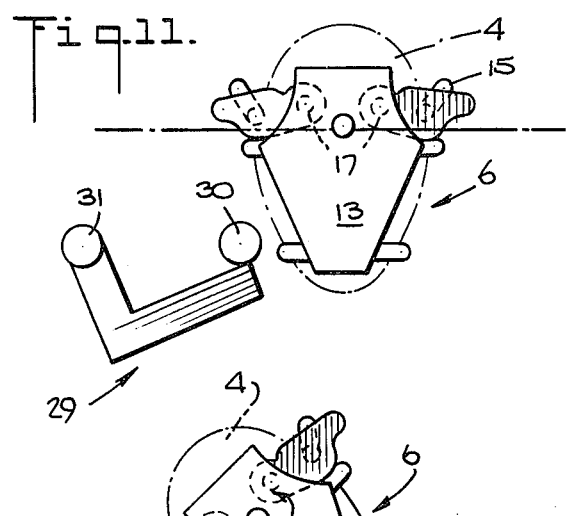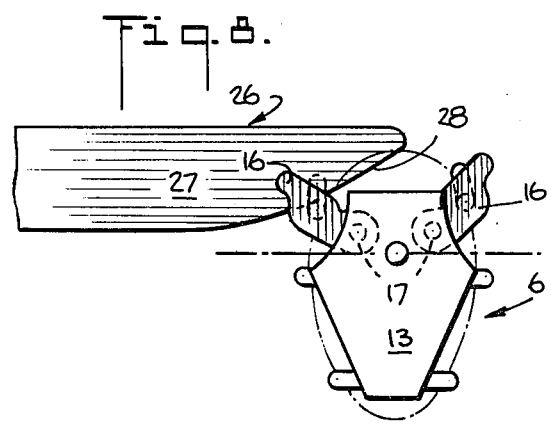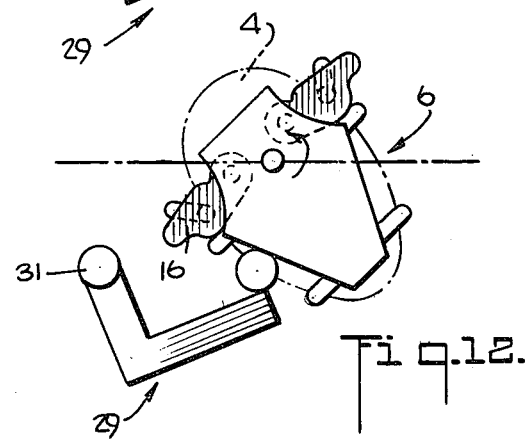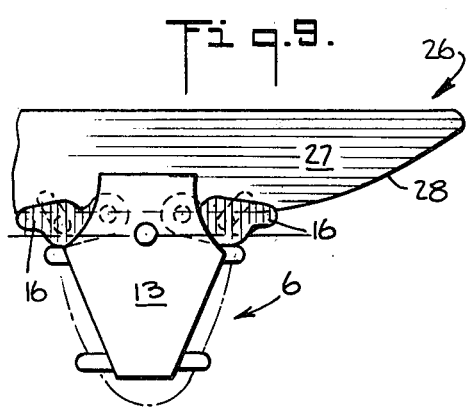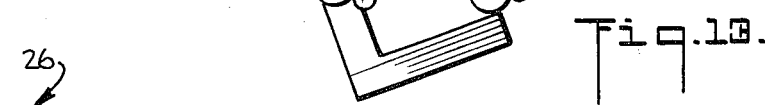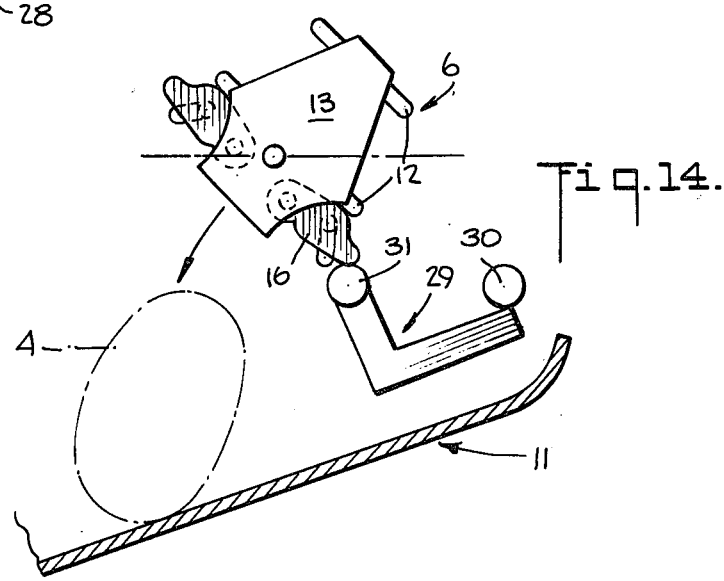

EGG CARRIER

BACKGROUND OF THE INVENTION

The present invention relates to food processing machinery and more particularly to an improved egg carrier system for use, for example, for carrying rows of eggs through cooking or other processing chambers. The carriers are mounted on endless chains and each carry a row of eggs, such as a typical twelve egg row. The carriers are formed with a preferred open or frame-like structure to expose the eggs to the processing mediums. Additionally, the carriers include effective and simplified automatically operated covers for securing the eggs in place in the carriers during the processing operations. The system also includes a carrier dumping arrangement activated by an automatic control positioned adjacent to the path of the carriers at an egg discharge position.

There are a number of egg processing operations which require the eggs to be carried through liquids or gases for cooking or other processing operations and where the eggs preferably are handled in rows. This has been done by providing carriers for the eggs having at least one open side or top for facilitating the loading and unloading of the carriers. The prior carriers have not been fully satisfactory due to their complexity and due to the fact that they drop eggs in certain instances where the eggs were carried through a liquid processing medium. Certain of the eggs floated or were otherwise forced out of the carriers resulting in a loss of product, a contamination of the processing chamber, and interference between the loose eggs and other moving carriers. The improved carriers of the present invention overcome these objections by providing a relatively simple and open carrier design which also includes an effective and sutomatically operated cover means for holding the eggs in place when necessary and which permits ready removal of the eggs at a carrier dumping mechanism or station.

The preferred carriers comprise spaced rods shaped to provide egg supporting compartments and having covers comprising additional pivotally mounted rods or bars. The covers are opened and closed by fixedly mounted opening, closing, and dumping mechanisms mounted adjacent to the carrier path.

Accordingly, an object of the present invention is to provide an improved carrier for rows of eggs.

Another object of the present invention is to provide an improved egg carrier system with automatically opened and closed covers.

Another object of the present invention is to provide an improved and relatively simple open egg carrier adapted for automatic cover opening and closing and for an automatic carrier dumping operation.

Another object of the present invention is to provide an improved frame-like sanitary egg carrier including automatic carrier cover operating means.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings forming a part of the specification, wherein:

FIG. 1 is a side elevational view partially in section illustrating a preferred carrier system in accordance with the present invention.

FIG. 2 is a perspective view of a preferred embodiment of an egg carrier in accordance with the present invention.

FIGS. 3 and 4 are top plan and front elevational views, respectively, of the egg carrier of FIG. 2.

FIG. 5 is an end view of a carrier in successive positions illustrating the operation of the top close mechanism.

FIG. 6 is a horizontal sectional view of the top close mechanism taken along line 6—6 on FIG. 5.

FIGS. 7, 8 and 9 are end views of an egg carrier illustrating successive positions of a carrier at the carrier top opening mechanism.

FIG. 10 is a top plan view illustrating an end of a carrier at the carrier top opening mechansim.

FIGS. 11 through 14 are end views of a carrier at successive positions at the carrier dump mechanism.

FIG. 15 is a top plan view of an end of a carrier at the carrier dump position.

DESCRIPTION OF THE PREFERRED EMBODIMENT

FIG. 1 illustrates an egg carrier system 1 in accordance with the present invention used with a hot water egg cooker 2 and a chilling tank 5. The cooker 2 comprises a water filled tank 3 heated to the preferred cooking temperature. The chilling tank 5 contains chilled water. The eggs 4 are carried through the tanks 3 and 5 on carriers 6. The carriers 6 are mounted by their opposite ends on a pair of endless roller chains 7 guided by suitable support sprockets 8 or sprocket shafts 9. The eggs 4 are loaded into the carriers 6 at a loading station 10 and are then successively submerged in the cooking and chilling waters for the necessary periods. The eggs 4 are thereafter dumped or removed from the system at a discharge station 11.

As will be more fully described below, the improved system of this invention includes means for automatically opening the carriers 6 prior to the discharge station 11 and for thereafter closing the carriers 6 to hold the eggs 4 in place during the cooking and chilling operations. In addition, the carrier system includes means for dumping the opened carriers 6 at the egg discharge station 11. These opening and closing and dumping mechanisms include members on the carriers 6 which are activated by cooperating members positioned on stationary supports along the pathways of the moving carriers 6.

FIGS. 2 through 5 illustrate a preferred embodiment of the carriers 6. Each carrier 6 includes spaced support rods 12 attached between a pair of end plates 13. The rods 12 are preferably formed with curved sections to define egg spacing pockets permitting the eggs 4 to be uniformily spaced in a row between the end plates 13. A centrally positioned middle support plate 14 is preferably included. The carrier cover comprises a pair of spaced and generally straight cover rods 15 which are pivotally mounted on the end plates 13. The pivotal mounting for each of the cover rods 15 comprises tabs 16 pivotally. attached by means of pins or bearings 17 at one end to end plates 13 and mounting a cover rod 15 outwardly of the pins 17. This permits the rods 15 to be swung between a closed position, as illustrated in FIG. 2, and an open position as illustrated in FIGS. 11 and 14.

Suitable spring means, such as the coil springs 18 are attached between two cover rods 15. The springs 18 act to releasably hold the rods 15 in both their open and closed positions as the springs 18 have a toggle-like over-center action in both positions as seen, for example, for the open position illustrated at the top of FIG. 5, and for the closed position as illustrated at the bottom of FIG. 5. The closed positions of the cover bars 15 are determined by stop tabs 19 on the end plates 13. The upper support rods 12 act as stops for the cover open position.

Each of the carriers 6 is attached to the roller chains 7 by means of elongated pins 20 (FIG. 10) projecting from the roller chains and engaging apertures 21 provided in each of the end plates 13.

The pins 20 preferably have enlarged heads on their free end which are proportioned to have a relatively close fit with the end plate 13 apertures 21 and the pin 20 spacing is arranged so the end plates 13 normally ride about midway between the enlarged pin ends 22 and the chain links. This arrangement keeps the carriers 6 in position on the chains 7 during operation and permits the carriers 6 to be readily removed when necessary for sanitizing or other purposes. The carriers are removed by the operators sliding the apertures 21 in the end plate over the free ends of the enlarged pin heads.

It is desirable to have the carrier 6 cover bars 15 closed when the carriers 6 are moving the eggs 4 through the cooking and chilling tanks 3 and 5 to prevent the eggs 4 from being displaced or floating free of the moving carriers 6. The carriers 6 are closed by a top closing mechanism 23 illustrated in FIGS. 1 and 5. The closing mechanism 23 comprises a pair of spaced closing pins 24 mounted on a suitable support 25 adjacent to the path of movement of the carrier end plates 13. When the carriers 6 move past the end closing mechanism 23, as illustrated in FIG. 5, spaced closing pins 24 engage the outer ends of two tabs 16. Further movement of the carrier 6 beyond the closing pins 24 causes the pins 24 to swing the two tabs 16 upwardly thereby moving the attached cover rods 15 upwardly and toward one another thereby confining the eggs 4 within the carrier 6.

After the cooking operation, the carriers 6 are opened to permit a subsequent egg unloading operation. The carrier top opening mechanism is illustrated at 26 in FIGS. 1 and 7–10. The mechanism 26 comprises an opening cam 27 fixedly mounted on the carrier mechanism adjacent the path of one end plate 13 of each carrier 6. The camming surface 28 of the top opening cam 27 is positioned to engage the two cover rods 15 at a position adjacent to the tabs 16. The camming surface 28 swings the rods 15 apart and downwardly as the rods 15 move along it in the manner illustrated in FIGS. 7 through 10.

After the carrier cover rods 15 have been opened, the eggs 4 are dumped from the carriers 6 onto a suitable discharge chute 11. FIGS. 11 through 15 illustrate the dumping mechanism 29. The mechanism 29 comprises a pair of dumping pins 30 and 31 arranged to provide an almost complete turnover of the carrier in a two-stage dumping motion. This almost full turnover obtained by a two-stage dumping pin action helps to dump eggs of differing sizes. The first dumping pin 30 engages a carrier end plate 13 as the plate 13 is carried against it by the moving chain 7. This engagement rotates the carrier about 60° or so to the position illustrated in FIG. 13. This initial rotation brings one of the end plate tabs 16 into engagement with the second dumping pin 31. Continued movement of the carrier 6 past the second dumping pin 31 providing an additional 60° or so of carrier rotation substantially inverting the carrier 6 causing the eggs 4 to drop clear of the carrier 6 onto the discharge chute 11. Thereafter, the opened and dumped and empty carriers 6 are returned on the endless chains 7 to the egg loading station 10 where another row of eggs 4 is dropped into position by a vacuum lifter or other egg feeding means.

It will be seen that an improved egg carrier and egg carrier system has been provided. An effective and sturdy open carrier supports eggs in a row for cooking or other processing steps. The carrier includes an egg engaging cover which is adapted for automatic opening and closing operations by mechanisms automatically activated through carrier movement. The carrier and carrier system are also adapted for effective and relatively simple dumping action also activated by carrier movement. The carrier is readily mounted and dismounted on its supporting chains without the use of nuts or bolts or other removable couplings for replacement or inspection of the carriers.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An improved carrier for eggs comprising the combination of:
    spaced end members;
    an elongated egg support including a plurality of rods extending between said end members;
    means for pivotally mounting said carrier on spaced endless conveyor members; and
    a cover pivotally mounted on said carrier including operatively connected activating members for moving the cover between open and closed positions.

2. The carrier as claimed in claim 1 in which said elongated egg support comprises spaced rods having curved portions forming egg receiving pockets.

3. The carrier as claimed in claim 1 in which said cover comprises a pair of rods each extending between said end members, and said activating members comprise a pair of pivoted tab members mounting each of said rods.

4. The carrier as claimed in claim 1 which further comprises stop means on one of said end members for determining the open and closed positions of said cover.

5. The carrier as claimed in claim 4 which further comprises spring means releasably urging said cover towards its open and closed positions.

6. An improved carrier for a row of eggs comprising the combination of:
    a pair of spaced end plates;
    a plurality of support rods having egg receiving compartments extending between said end plates;
    said support rods being spaced from one another in an egg supporting array;
    a cover rod extending between said end plates; and a pivotal attachment between said cover rod and both of said end plates permitting said cover rod to move between closed and open positions, and means for moving said cover rod.

7. An improved carrier system for eggs comprising the combination of:
- a plurality of elongated carriers including spaced rods adapted for supporting rows of eggs;
- a pair of endless chains supported on sprockets for carrying the egg carriers through a closed path;
- means pivotally mounting said carriers between said chains for movement therewith;
- a movably mounted cover on each of said carriers;
- a cover closing means fixedly mounted adjacent to one of said chains; and
- a cover opening means fixedly mounted adjacent to one of said chains beyond said cover closing means.

8. The carrier system as claimed in claim 7 which further comprises a carrier dumping means fixedly mounted adjacent to one of said chains beyond said carrier opening means.

9. The carrier system as claimed in claim 8 in which said carrier dumping means comprises a first fixedly mounted member positioned to engage and to tilt each carrier on its pivotal mounting, and a second fixedly mounted member positioned beyond said first member for engaging each carrier and further tilting it to a dumping position.

* * * * *